(12) United States Patent
Honea (10) Patent No.: US 9,537,425 B2
(45) Date of Patent: Jan. 3, 2017

(54) MULTILEVEL INVERTERS AND THEIR COMPONENTS

(71) Applicant: Transphorm Inc., Goleta, CA (US)

(72) Inventor: James Honea, Santa Barbara, CA (US)

(73) Assignee: Transphorm Inc., Goleta, CA (US)

( * ) Notice: Subject to any disclaimer, the term of this patent is extended or adjusted under 35 U.S.C. 154(b) by 0 days.

(21) Appl. No.: 14/321,269

(22) Filed: Jul. 1, 2014

(65) Prior Publication Data

US 2015/0016169 A1   Jan. 15, 2015

Related U.S. Application Data

(60) Provisional application No. 61/844,260, filed on Jul. 9, 2013.

(51) Int. Cl.
*H02M 7/5387*   (2007.01)
*H02M 7/483*   (2007.01)
(Continued)

(52) U.S. Cl.
CPC ........... *H02M 7/5387* (2013.01); *H02M 7/483* (2013.01); *H02M 7/487* (2013.01);
(Continued)

(58) Field of Classification Search
CPC  H02M 7/537; H02M 7/5387; H02M 3/33507; H02M 7/483; H02M 7/487; H02M 2001/0054; H02M 2001/007; H02M 2007/483; Y02B 70/1491
(Continued)

(56) References Cited

U.S. PATENT DOCUMENTS

| 4,321,489 A | 3/1982 | Higuchi et al. |
| 4,384,287 A | 5/1983 | Sakuma |

(Continued)

FOREIGN PATENT DOCUMENTS

| CN | 1921148 | 2/2007 |
| CN | 101978589 | 2/2011 |

(Continued)

OTHER PUBLICATIONS

U.S. Appl. No. 11/856,695, filed Sep. 17, 2007, Gallium Nitride Diodes and Integrated Components.

(Continued)

*Primary Examiner* — Jeffrey Gblende
*Assistant Examiner* — Alex Torres-Rivera
(74) *Attorney, Agent, or Firm* — Fish & Richardson P.C.

(57) ABSTRACT

A multilevel inverter includes a first half bridge in series with a second half bridge, each comprising a switch having a channel. The switch is configured to block a substantial voltage in a first direction during a first mode of operation, to conduct substantial current through the channel in the first direction during a second mode of operation, and to conduct substantial current through the channel in a second direction during a third mode of operation. During the third mode of operation, a gate of the switch is biased relative to a source of the switch at a voltage that is less than a threshold voltage of the switch. The inverter may also include a third half bridge. The inverter can be configured such that in operation, switches of the third half bridge are switched at a substantially lower frequency than the switches of the first and second half bridges.

9 Claims, 8 Drawing Sheets

(51) Int. Cl.
*H02M 7/487* (2007.01)
*H02M 1/00* (2006.01)

(52) U.S. Cl.
CPC ............... *H02M 2001/007* (2013.01); *H02M 2001/0054* (2013.01); *Y02B 70/1491* (2013.01)

(58) Field of Classification Search
USPC ................. 363/71, 98, 127, 131, 132, 65
See application file for complete search history.

(56) References Cited

U.S. PATENT DOCUMENTS

| | | | |
|---|---|---|---|
| 4,665,508 A | | 5/1987 | Chang |
| 4,728,826 A | | 3/1988 | Einzinger et al. |
| 4,808,853 A | | 2/1989 | Taylor |
| 4,864,479 A | | 9/1989 | Steigerwald et al. |
| 5,198,964 A | | 3/1993 | Ito et al. |
| 5,379,209 A | | 1/1995 | Goff |
| 5,493,487 A | | 2/1996 | Close et al. |
| 5,621,634 A | * | 4/1997 | Sato ................. H02M 7/487 363/96 |
| 5,637,922 A | | 6/1997 | Fillion et al. |
| 5,767,573 A | | 6/1998 | Noda et al. |
| 5,789,951 A | | 8/1998 | Shen et al. |
| 5,952,856 A | | 9/1999 | Horiguchi et al. |
| 6,008,684 A | | 12/1999 | Ker et al. |
| 6,107,844 A | | 8/2000 | Berg et al. |
| 6,130,831 A | | 10/2000 | Matsunaga |
| 6,172,550 B1 | | 1/2001 | Gold et al. |
| 6,333,617 B1 | | 12/2001 | Itabashi et al. |
| 6,395,593 B1 | | 5/2002 | Pendharkar et al. |
| 6,455,905 B1 | | 9/2002 | Perugupalli et al. |
| 6,469,919 B1 | * | 10/2002 | Bennett ............. H01J 37/32082 363/132 |
| 6,480,403 B1 | * | 11/2002 | Bijlenga ............... H02M 7/487 363/132 |
| 6,521,940 B1 | | 2/2003 | Vu et al. |
| 6,556,053 B2 | | 4/2003 | Stanley |
| 6,633,195 B2 | | 10/2003 | Baudelot et al. |
| 6,650,169 B2 | | 11/2003 | Faye et al. |
| 6,700,804 B1 | | 3/2004 | Reichard |
| 6,781,423 B1 | | 8/2004 | Knoedgen |
| 6,864,131 B2 | | 3/2005 | Thornton |
| 6,876,235 B2 | | 4/2005 | Li et al. |
| 6,900,657 B2 | | 5/2005 | Bui et al. |
| 6,975,023 B2 | | 12/2005 | Oliver et al. |
| 7,116,567 B2 | | 10/2006 | Shelton et al. |
| 7,193,396 B2 | | 3/2007 | Orr |
| 7,199,636 B2 | | 4/2007 | Oswald et al. |
| 7,199,640 B2 | | 4/2007 | De Cremoux et al. |
| 7,212,063 B2 | | 5/2007 | Münzer et al. |
| 7,227,198 B2 | | 6/2007 | Pavier et al. |
| 7,239,108 B2 | | 7/2007 | Best |
| 7,304,331 B2 | | 12/2007 | Saito et al. |
| 7,368,980 B2 | | 5/2008 | Benelbar et al. |
| 7,375,407 B2 | | 5/2008 | Yanagihara et al. |
| 7,378,883 B1 | | 5/2008 | Hsueh |
| 7,382,001 B2 | | 6/2008 | Beach |
| 7,417,257 B2 | | 8/2008 | Beach et al. |
| 7,443,648 B2 | | 10/2008 | Cutter et al. |
| 7,449,730 B2 | | 11/2008 | Kuraguchi |
| 7,453,107 B1 | | 11/2008 | Kapoor |
| 7,465,997 B2 | | 12/2008 | Kinzer et al. |
| 7,477,082 B2 | | 1/2009 | Fukazawa |
| 7,482,788 B2 | | 1/2009 | Yang |
| 7,501,669 B2 | | 3/2009 | Parikh et al. |
| 7,522,435 B2 | | 4/2009 | Kohnotoh et al. |
| 7,538,366 B2 | | 5/2009 | Saito et al. |
| 7,547,964 B2 | | 6/2009 | Pavier et al. |
| 7,548,112 B2 | | 6/2009 | Sheppard |
| 7,550,781 B2 | | 6/2009 | Kinzer et al. |
| 7,612,602 B2 | | 11/2009 | Yang et al. |
| 7,639,064 B2 | | 12/2009 | Hsiao et al. |
| 7,701,009 B2 | | 4/2010 | Koyama |
| 7,714,360 B2 | | 5/2010 | Otsuka et al. |
| 7,719,055 B1 | | 5/2010 | McNutt et al. |
| 7,745,930 B2 | | 6/2010 | Connah et al. |
| 7,746,020 B2 | | 6/2010 | Schnetzka et al. |
| 7,755,108 B2 | | 7/2010 | Kuraguchi |
| 7,782,099 B2 | | 8/2010 | Kawamura |
| 7,795,642 B2 | | 9/2010 | Suh et al. |
| 7,800,215 B2 | | 9/2010 | Satou et al. |
| 7,804,328 B2 | | 9/2010 | Pentakota et al. |
| 7,811,872 B2 | | 10/2010 | Hoshi et al. |
| 7,851,825 B2 | | 12/2010 | Suh et al. |
| 7,851,909 B2 | | 12/2010 | Mishra et al. |
| 7,852,137 B2 | | 12/2010 | Machida et al. |
| 7,855,401 B2 | | 12/2010 | Sheppard et al. |
| 7,863,877 B2 | | 1/2011 | Briere |
| 7,875,907 B2 | | 1/2011 | Honea et al. |
| 7,875,914 B2 | | 1/2011 | Sheppard |
| 7,884,394 B2 | | 2/2011 | Wu et al. |
| 7,884,395 B2 | | 2/2011 | Saito |
| 7,893,676 B2 | | 2/2011 | Hanna |
| 7,893,791 B2 | | 2/2011 | Ma et al. |
| 7,898,004 B2 | | 3/2011 | Wu et al. |
| 7,898,509 B2 | | 3/2011 | Iida et al. |
| 7,902,809 B2 | | 3/2011 | Briere et al. |
| 7,906,837 B2 | | 3/2011 | Cabahug et al. |
| 7,915,643 B2 | | 3/2011 | Suh et al. |
| 7,920,013 B2 | | 4/2011 | Sachdev et al. |
| 7,932,539 B2 | | 4/2011 | Chen et al. |
| 7,939,391 B2 | | 5/2011 | Suh et al. |
| 7,965,126 B2 | * | 6/2011 | Honea ............... H03K 17/08142 327/110 |
| 7,973,335 B2 | | 7/2011 | Okamoto et al. |
| 7,982,242 B2 | | 7/2011 | Goto |
| 8,013,580 B2 | | 9/2011 | Cervera et al. |
| 8,018,056 B2 | | 9/2011 | Hauenstein |
| 8,054,110 B2 | | 11/2011 | Wang et al. |
| 8,063,616 B2 | | 11/2011 | Bahramian et al. |
| 8,084,783 B2 | | 12/2011 | Zhang |
| 8,089,139 B2 | | 1/2012 | Shi et al. |
| 8,114,710 B2 | | 2/2012 | Muto et al. |
| 8,138,529 B2 | | 3/2012 | Wu |
| 8,188,596 B2 | | 5/2012 | Otremba |
| 8,193,559 B2 | | 6/2012 | Haeberlen et al. |
| 8,193,562 B2 | | 6/2012 | Suh et al. |
| 8,237,198 B2 | | 8/2012 | Wu et al. |
| 8,258,622 B2 | | 9/2012 | Lee et al. |
| 8,289,065 B2 | | 10/2012 | Honea et al. |
| 8,344,424 B2 | | 1/2013 | Suh et al. |
| 8,363,437 B2 | | 1/2013 | Wang et al. |
| 8,389,977 B2 | | 3/2013 | Chu et al. |
| 8,390,000 B2 | | 3/2013 | Chu et al. |
| 8,441,128 B2 | | 5/2013 | Domes |
| 8,455,931 B2 | | 6/2013 | Wu |
| 8,493,129 B2 | | 7/2013 | Honea et al. |
| 8,508,281 B2 | | 8/2013 | Honea et al. |
| 8,519,438 B2 | | 8/2013 | Mishra et al. |
| 8,530,904 B2 | | 9/2013 | Treu et al. |
| 8,531,232 B2 | | 9/2013 | Honea et al. |
| 8,541,818 B2 | | 9/2013 | Wu et al. |
| 8,592,974 B2 | | 11/2013 | Wu |
| 8,598,937 B2 | | 12/2013 | Lal et al. |
| 8,624,662 B2 | | 1/2014 | Parikh et al. |
| 8,633,518 B2 | | 1/2014 | Suh et al. |
| 8,643,062 B2 | | 2/2014 | Parikh et al. |
| 8,648,643 B2 | | 2/2014 | Wu |
| 8,681,518 B2 | | 3/2014 | Callanan et al. |
| 8,692,294 B2 | | 4/2014 | Chu et al. |
| 8,716,141 B2 | | 5/2014 | Dora et al. |
| 8,742,459 B2 | | 6/2014 | Mishra et al. |
| 8,742,460 B2 | | 6/2014 | Mishra et al. |
| 8,772,842 B2 | | 7/2014 | Dora |
| 8,786,327 B2 | | 7/2014 | Honea et al. |
| 8,803,246 B2 | | 8/2014 | Wu et al. |
| 8,816,497 B2 | | 8/2014 | Wu |
| 8,816,751 B2 | | 8/2014 | Honea et al. |
| 8,841,702 B2 | | 9/2014 | Mishra et al. |
| 8,860,495 B2 | | 10/2014 | Lal et al. |
| 2007/0210329 A1 | | 9/2007 | Goto |
| 2008/0017998 A1 | | 1/2008 | Pavio |
| 2008/0248634 A1 | | 10/2008 | Beach |

(56) References Cited

U.S. PATENT DOCUMENTS

| | | |
|---|---|---|
| 2009/0050936 A1 | 2/2009 | Oka |
| 2009/0072269 A1 | 3/2009 | Suh et al. |
| 2009/0278513 A1 | 11/2009 | Bahramian et al. |
| 2011/0103116 A1* | 5/2011 | Asplund ............... H02J 3/36 363/131 |
| 2011/0115532 A1* | 5/2011 | Roesner .............. H02M 7/487 327/136 |
| 2011/0169549 A1 | 7/2011 | Wu |
| 2011/0280055 A1* | 11/2011 | Nielsen ............... H02J 1/102 363/131 |
| 2012/0218795 A1 | 8/2012 | Mihalache |
| 2012/0287690 A1* | 11/2012 | Paatero ............... H02M 7/487 363/134 |
| 2012/0306464 A1 | 12/2012 | Hirler et al. |
| 2013/0088901 A1* | 4/2013 | Bleus ................. H02M 7/487 363/71 |
| 2013/0094265 A1* | 4/2013 | Lai .................... H02M 7/487 363/131 |

FOREIGN PATENT DOCUMENTS

| | | |
|---|---|---|
| CN | 102165694 | 8/2011 |
| CN | 102308387 | 1/2012 |
| CN | 102694479 | 9/2012 |
| CN | 103477543 | 12/2013 |
| EP | 2 188 842 | 5/2010 |
| EP | 2 243 213 | 10/2010 |
| EP | 2 394 303 | 12/2011 |
| JP | 5-075040 | 3/1993 |
| JP | 6-067744 | 3/1994 |
| JP | 2000-101356 | 4/2000 |
| JP | 2000-124358 | 4/2000 |
| JP | 2003-244943 | 8/2003 |
| JP | 2003-338742 | 11/2003 |
| JP | 2004-281454 | 10/2004 |
| JP | 2006-033723 | 2/2006 |
| JP | 2006-173754 | 6/2006 |
| JP | 2007-036218 | 2/2007 |
| JP | 2007-215331 | 8/2007 |
| JP | 2007-294769 | 11/2007 |
| JP | 2008-199771 | 8/2008 |
| JP | 2010-525023 | 7/2010 |
| JP | 2011-072118 | 4/2011 |
| JP | 2011-512119 | 4/2011 |
| JP | 2012-517699 | 8/2012 |
| JP | 2012-170327 | 9/2012 |
| TW | 200941920 | 10/2009 |
| TW | 201027912 | 7/2010 |
| TW | 201036155 | 10/2010 |
| TW | 201126686 | 8/2011 |
| TW | 201143017 | 12/2011 |
| TW | 201332085 | 8/2013 |
| TW | 201347143 | 11/2013 |
| WO | WO 2009/036266 | 3/2009 |
| WO | WO 2009/102732 | 8/2009 |
| WO | WO 2010/039463 | 4/2010 |
| WO | WO 2010/090885 | 8/2010 |
| WO | WO 2011/053981 | 5/2011 |
| WO | WO 2011/085260 | 7/2011 |
| WO | WO 2011/097302 | 8/2011 |
| WO | WO 2013/085839 | 6/2013 |

OTHER PUBLICATIONS

U.S. Appl. No. 14/108,642, filed Dec. 17, 2013, Gallium Nitride Power Devices.
U.S. Appl. No. 60/971,721, filed Sep. 12, 2007, III-Nitride Bilateral Switches.
U.S. Appl. No. 60/972,467, filed Sep. 14, 2007, Growing N-Polar III-Nitride Structures.
U.S. Appl. No. 12/209,504, filed Sep. 12, 2008, Growing N-Polar III-Nitride Structures.
U.S. Appl. No. 60/972,481, filed Sep. 14, 2007, III-Nitride Devices with Recessed Gates.
U.S. Appl. No. 61/012,755, filed Dec. 10, 2007, Insulated Gate E-Mode Transistors.
U.S. Appl. No. 61/028,133, filed Feb. 12, 2008, Bridge Circuits and their Components.
U.S. Appl. No. 13/887,204, filed May 3, 2013, Bridge Circuits and their Components.
U.S. Appl. No. 14/464,639, filed Aug. 20, 2014, Enhancement Mode III-N HEMTs.
U.S. Appl. No. 61/099,451, filed Sep. 23, 2008, Inductive Load Power Switching Circuits.
U.S. Appl. No. 14/332,967, filed Jul. 16, 2014, Inductive Load Power Switching Circuits.
U.S. Appl. No. 13/973,890, filed Aug. 22, 2013, Semiconductor Heterostructure Diodes.
U.S. Appl. No. 14/063,438, filed Oct. 25, 2013, Package Configurations for Low EMI Circuits.
U.S. Appl. No. 13/756,284, filed Jan. 31, 2013, Methods of Forming Reverse Side Engineered III-Nitride Devices.
U.S. Appl. No. 14/262,649, filed Apr. 25, 2014, High Voltage III-Nitride Semiconductor Devices.
U.S. Appl. No. 14/178,701, filed Feb. 12, 2014, Semiconductor Devices with Field Plates.
U.S. Appl. No. 14/336,287, filed Jul. 21, 2014, Electronic Devices and Components for High Efficiency Power Circuits.
U.S. Appl. No. 14/058,089, filed Oct. 18, 2013, Semiconductor Electronic Components and Circuits.
U.S. Appl. No. 14/260,808, filed Apr. 24, 2014, Transistors with Isolated Regions.
U.S. Appl. No. 12/953,769, filed Nov. 24, 2010, Layer Structures for Controlling Stress of Heteroepitaxially Grown III-Nitride Layers.
U.S. Appl. No. 13/226,380, filed Sep. 6, 2011, Semiconductor Devices with Guard Rings.
U.S. Appl. No. 14/530,204, filed Oct. 31, 2014, Semiconductor Devices with Guard Rings.
U.S. Appl. No. 14/102,750, filed Dec. 11, 2013, III-N Device Structures and Methods.
U.S. Appl. No. 14/522,154, filed Oct. 23, 2014, III-N Device Structures and Methods.
U.S. Appl. No. 14/288,682, filed May 28, 2014, Method for Making Semiconductor Diodes with Low Reverse Bias Currents.
U.S. Appl. No. 14/524,299, filed Oct. 27, 2014, Semiconductor Diodes with Low Reverse Bias Currents.
U.S. Appl. No. 14/211,104, filed Mar. 14, 2014, Electrode Configurations for Semiconductor Devices.
U.S. Appl. No. 61/447,519, filed Feb. 28, 2011, Electronic Components with Reactive Filters.
U.S. Appl. No. 14/307,234, filed Jun. 17, 2014, Method of Forming Electronic Components with Reactive Filters.
U.S. Appl. No. 61/568,022, filed Dec. 7, 2011, Semiconductor Modules and Methods of Forming the Same.
U.S. Appl. No. 13/690,103, filed Nov. 30, 2012, Semiconductor Modules and Methods of Forming the Same.
U.S. Appl. No. 13/366,090, filed Feb. 3, 2012, Buffer Layer Structures Suited for III-Nitride Devices with Foreign Substrates.
U.S. Appl. No. 14/134,878, filed Dec. 19, 2013, Semiconductor Power Modules and Devices.
U.S. Appl. No. 61/621,956, filed Apr. 9, 2012, N-Polar III-Nitride Transistors.
U.S. Appl. No. 13/859,635, filed Apr. 9, 2013, N-Polar III-Nitride Transistors.
U.S. Appl. No. 61/765,635, filed Feb. 15, 2013, Electrodes for Semiconductor Devices and Methods of Forming the Same.
U.S. Appl. No. 14/179,788, filed Feb. 13, 2014, Electrodes for Semiconductor Devices and Methods of Forming the Same.
U.S. Appl. No. 61/791,395, filed Mar. 15, 2013, Carbon Doping Semiconductor Devices.
U.S. Appl. No. 14/208,304, filed Mar. 13, 2014, Carbon Doping Semiconductor Devices.
U.S. Appl. No. 13/799,989, filed Mar. 13, 2013, Enhancement-Mode III-Nitride Devices.

(56) References Cited

OTHER PUBLICATIONS

U.S. Appl. No. 61/807,258, filed Apr. 1, 2013, Gate Drivers for Circuits Based on Semiconductor Devices.
U.S. Appl. No. 14/222,992, filed Mar. 24, 2014, Gate Drivers for Circuits Based on Semiconductor Devices.
U.S. Appl. No. 61/844,260, filed Jul. 9, 2013, Multilevel Inverters and their Components.
U.S. Appl. No. 61/856,573, filed Jul. 19, 2013, III-Nitride Transistor Including a P-Type Depleting Layer.
U.S. Appl. No. 14/327,371, filed Jul. 9, 2014, III-Nitride Transistor Including a P-Type Depleting Layer.
U.S. Appl. No. 14/208,482, filed Mar. 13, 2014, Carbon Doping Semiconductor Devices.
U.S. Appl. No. 13/231,308, filed Sep. 13, 2011, III-N Device Structures Having a Non-Insulating Substrate.
U.S. Appl. No. 14/478,504, filed Sep. 5, 2014, Method of Forming Electronic Components with Increased Reliability.
U.S. Appl. No. 13/535,094, filed Jun. 27, 2012, Semiconductor Devices with Integrated Hole Collectors.
U.S. Appl. No. 14/311,600, filed Jun. 23, 2014, Semiconductor Electronic Components with Integrated Current Limiters.
U.S. Appl. No. 13/551,094, filed Jul. 17, 2012, Contacts for Semiconductor Devices and Methods of Forming the Same.
U.S. Appl. No. 61/672,723, filed Jul. 17, 2012, Devices and Components for Power Conversion Circuits.
U.S. Appl. No. 13/803,912, filed Mar. 14, 2013, Devices and Components for Power Conversion Circuits.
U.S. Appl. No. 14/323,777, filed Jul. 3, 2014, Switching Circuits Having Ferrite Beads.
Authorized officer Keon Hyeong Kim, International Search Report and Written Opinion in PCT/US2008/076160 mailed Mar. 18, 2009, 11 pages.
Authorized officer Simin Baharlou, International Preliminary Report on Patentability in PCT/US2008/076160, mailed Mar. 25, 2010, 6 pages.
Authorized officer Jae Woo Wee, International Search Report and Written Opinion in PCT/US2009/033699, mailed Sep. 21, 2009, 11 pages.
Authorized officer Dorothée Miilhausen, International Preliminary Report on Patentability in PCT/US2009/033699, mailed Aug. 26, 2010, 6 pages.
Authorized officer Sung Hee Kim, International Search Report and the Written Opinion in PCT/US2009/057554, mailed May 10, 2010, 13 pages.
Authorized Officer Gijsbertus Beijer, International Preliminary Report on Patentability in PCT/US2009/057554, mailed Mar. 29, 2011, 7 pages.
Authorized officer Sung Chan Chung, International Search Report and Written Opinion for PCT/US2010/021824, mailed Aug. 23, 2010, 9 pages.
Authorized officer Beate Giffo-Schmitt, International Preliminary Report on Patentability in PCT/US2010/021824, mailed Aug. 18, 2011, 6 pages.
Authorized officer Bon Gyoung Goo, International Search Report and Written Opinion in PCT/US2010/055129, mailed Jul. 1, 2011, 11 pages.
Authorized officer Yolaine Cussac, International Preliminary Report on Patentability in PCT/US2010/055129, mailed May 18, 2012, 6 pages.
Authorized officer Sung Joon Lee, International Search Report and Written Opinion in PCT/US2011/020592, mailed Sep. 19, 2011, 9 pages.
Authorized officer Philippe Bécamel, International Preliminary Report on Patentability in PCT/US2011/020592, mailed Jul. 19, 2012, 7 pages.
Authorized officer Kee Young Park, International Search Report and Written Opinion in PCT/US2011/023485, mailed Sep. 23 2011, 10 pages.
Authorized officer Nora Lindner, International Preliminary Report on Patentability in PCT/US2011/023485, mailed Aug. 16, 2012, 7 pages.
Authorized officer Kwak In Gu, International Search Report and Written Opinion in PCT/US2012/026810, mailed Jan. 23, 2013, 10 pages.
Authorized officer Lingfei Bai, International Preliminary Report on Patentability in PCT/US2012/026810, mailed Sep. 12, 2013, 6 pages.
Authorized officer Sung Gon Kim, International Search Report and Written Opinion in PCT/US2014/032241, mailed Aug. 11, 2014, 12 pages.
Authorized officer Hye Lyun Park, International Search Report and Written Opinion in PCT/US2014/045137, mailed Oct. 16, 2014, 9 pages.
Search Report and Action in TW Application No. 098132132, issued Dec. 6, 2012, 8 pages.
Search Report and Action in TW Application No. 098141930, issued Jul. 10, 2014, 7 pages.
Chinese Third Office Action in Application No. 200980110230.0, Jan. 24, 2014, 18 pages.
Japanese Office action in Application No. 2010-546867, Sep. 24, 2013, 14 pages.
Chen et al., "Single-Chip Boost Converter Using Monolithically Integrated AlGan/GaN Lateral Field-Effect Rectifier and Normally Off HEMT," IEEE Electron Device Letters, May 2009, 30(5):430-432.
Choi et al., "AN-9005 Driving and Layout Design for Fast Switching Super-junction MOSFETs," © 2013 Fairchild Corporation, 13 pages.
Napierala et al., "Selective GaN Epitaxy on Si(111) Substrates Using Porous Aluminum Oxide Buffer Layers," Journal of the Electrochemical Society, 2006. 153(2):G125-G127, 4 pages.
Rodríguez et al, "Tutorial on Multilevel Converters," International Conference on Power Electronics and Intelligent Control for Energy Conservation, Warsaw, Poland, Oct. 17-19, 2005, 148 pages.
Wu et al., "A 97.8% Efficient GaN HEMT Boost Converter with 300-W Output Power at 1MHz,"Electronic Device Letters, 2008, IEEE, 29(8):824-826.
Authorized officer Athina Nickitas-Etienne, International Preliminary Report on Patentabililty in PCT/US2014/032241, mailed Oct. 15, 2015, 9 pages.
Authorized officer Agnès Wittmann-Regis, International Preliminary Report on Patentability in PCT/US2014/045137, mailed Jan. 21, 2016, 6 pages.

\* cited by examiner

MULTILEVEL INVERTERS AND THEIR COMPONENTS

CROSS-REFERENCE TO RELATED APPLICATION

This application claims priority to U.S. Provisional Application No. 61/844,260, filed on Jul. 9, 2013. The disclosure of the prior application is considered part of and is incorporated by reference in the disclosure of this application.

TECHNICAL FIELD

This invention relates to multilevel power inverter circuits and the components of which they are comprised.

BACKGROUND

Figure 1:
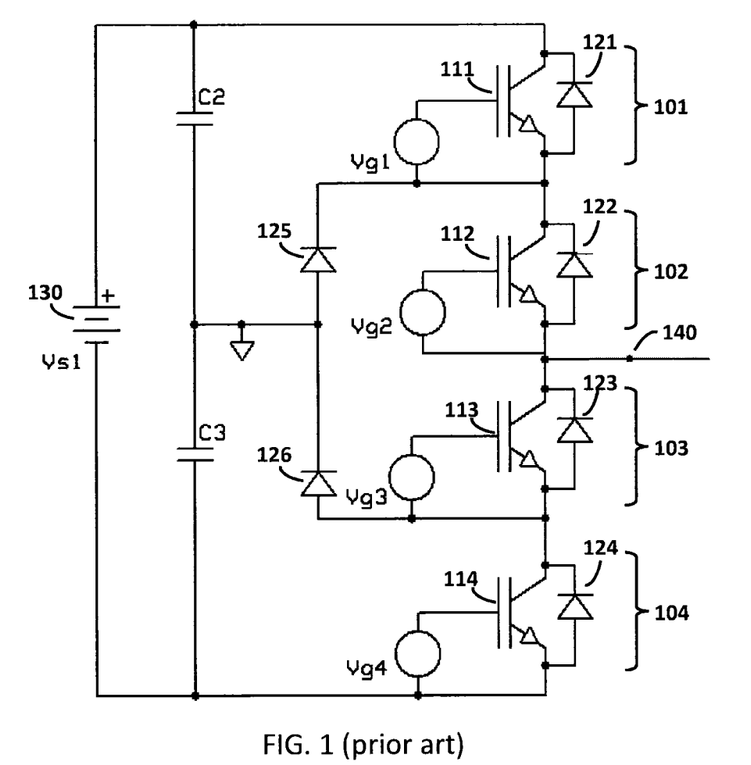
FIG. 1 is a schematic of a prior art 3-level inverter with neutral-point clamp.

Compared to a simple two-level inverter, multilevel inverters can provide higher operating voltage for a given device rating, lower voltage distortion because of smaller voltage steps, and reduced interference signals. A typical prior art three-level inverter circuit is shown in FIG. 1. The inverter circuit includes four switches 101-104, each switch being formed of an insulated gate bipolar transistor or IGBT (111-114) and a diode (121-124). Diodes 121-124, which carry freewheeling currents through the switches 101-104 during times that the switches conduct in the reverse direction (i.e., when current flows from source to drain), are included to prevent conduction through the intrinsic parasitic diodes that are inherent in IGBT devices and are anti-parallel to the channels of the IGBT devices.

The inverter topology shown in FIG. 1 is referred to as a neutral-point clamped (NPC) inverter, because diodes 125 and 126 serve to clamp their respective switched nodes to the neutral point, here represented as the midpoint of voltage supply 130, which supplies a voltage Vs1. There are three possible output voltages at output node 140: +(Vs1)/2 (when IGBT transistors 111 and 112 are ON and IGBT transistors 113 and 114 are OFF), 0 (when IGBT transistors 112 and 113 are ON and IGBT transistors 111 and 114 are OFF), and −(Vs1)/2 (when IGBT transistors 113 and 114 are ON, and IGBT transistors 111 and 112 are OFF). To permit current flow in either direction, the 0 level is normally achieved by turning on both IGBT transistors 112 and 113. During operation of this circuit, none of the four transistors (111-114) or six diodes (121-126) ever blocks a voltage in excess of about (Vs1)/2, even though the output voltage at node 140 swings across the entire range of Vs1 [i.e., the minimum output voltage is −(Vs1)/2, and the maximum output voltage is +Vs1)/2].

As shown in FIG. 1 and previously described, the transistors 111-114 are insulated gate bipolar transistors (IGBTs). These IGBTs could be devices rated to operate at voltages up to 600V, for example, and Vs1 could be as high as 1200V, which is two times the rated voltage of each of the IGBTs. Although 1200V rated devices exist, the cost and performance of 600V devices is often superior. In the simplest mode of operation, the output voltage at node 140 is switched between the three possible output voltage levels in sequence which repeats at the desired fundamental frequency of the output, such as 60 Hz, for example. In the case where a sinusoidal output is desired, lower distortion can be achieved if a pulse-width modulation (PWM) technique is employed to apply the switching voltages to the gates of each of the transistors 111-114. During the half cycle where the output voltage at node 140 should be positive, the gate of transistor 111 is pulsed ON and OFF at some switching frequency which is appreciably higher than that of the desired output. A PWM switching frequency of 10 kHz, for example, could be used to generate a 60 Hz output.

SUMMARY

A DC-AC inverter circuit comprising at least two half-bridges capable of efficient high-frequency switching without freewheeling diodes, which are connected to a common output with switching transistors switched at the low, fundamental frequency, is described. The circuit enables increased power density through reduced component count, higher efficiency, and smaller-sized passive filter components.

A DC-AC inverter circuit, as in the previous paragraph, is described for which the filter function can be moved to intermediate nodes, such that the output transistors are decoupled from the high-frequency switching.

In one aspect, a multilevel inverter comprises a first half bridge connected in series with a second half bridge, where each half bridge comprises a semiconductor-based switch having a channel. Each switch is configured to block a substantial voltage in a first direction during a first mode of operation, to conduct substantial current through the channel in the first direction during a second mode of operation, and to conduct substantial current through the channel in a second direction during a third mode of operation. During the third mode of operation, a gate of the switch is biased relative to a source of the switch at a voltage that is less than a threshold voltage of the switch.

In a second aspect, a multilevel inverter comprises a first half bridge connected in series with a second half bridge, where each half bridge comprises a plurality of switches, and a third half bridge comprising a high-side switch coupled to a low-side switch. The high-side switch includes a first gate and a first power terminal and the low-side switch includes a second gate and a second power terminal. The inverter is configured such that in operation, the high-side switch and low-side switch are switched at a substantially lower frequency of switching than the plurality of switches of the first and second half bridges.

In a third aspect, a multilevel inverter comprises a first half bridge connected in series with a second half bridge, where each half bridge comprises a plurality of switches. The inverter further includes a third half bridge comprising a high-side switch coupled to a low-side switch, where the high-side switch includes a first gate and a first power terminal and the low-side switch includes a second gate and a second power terminal, and two low-pass filters. The first low-pass filter is coupled between an output node of the first half bridge and the first power terminal of the high-side switch, and the second low-pass filter is coupled between an output node of the second half bridge and the second power terminal of the low-side switch.

Devices described herein can each include one or more of the following features. A multilevel inverter may include a third half bridge that has a low-side switch coupled to a high-side switch, wherein an output node of the first half bridge is coupled to a power terminal of the high-side switch, and an output node of the second half bridge is coupled to a power terminal of the low-side switch. Additionally, the low-side switch and the high-side switch of the third half bridge may each be configured to switch at a substantially lower frequency than a switching frequency of the semiconductor-based switch. Furthermore, the multilevel inverter may include one filter, which is connected to the output node of the third half bridge, or two filters, where the first filter is coupled between the output node of the first half bridge and the power terminal of the high-side switch, and the second filter is coupled between the output node of the second half bridge and the second power terminal of the low-side switch. The semiconductor-based switch of the inverter can comprise a III-Nitride transistor, or can comprise an enhancement-mode transistor coupled to a III-Nitride depletion-mode transistor.

The multilevel inverter may be constructed such that an output node of the first half bridge is electrically coupled to the first power terminal of the high-side switch, and an output node of the second half bridge is electrically coupled to the second power terminal of the low-side switch. The multilevel inverter can be configured such that in operation, the switching frequency of the plurality of switches of the first and second half bridges may be at least five times greater than the switching frequency of the high-side and the low-side switch. The multilevel inverter can be configured such that in operation, the switching frequency of the plurality of switches of the first and second half bridges is at least 50 kHz and the switching frequency of the high-side switch and the low-side switch is 1 kHz or less. The multilevel inverter may include a III-Nitride transistor or an enhancement-mode transistor coupled to a III-Nitride depletion-mode transistor for at least one of the plurality of switches. The first low-pass filter and the second low-pass filter may each include an inductor and a capacitor.

DESCRIPTION OF DRAWINGS

Like reference symbols in the various drawings indicate like elements.

DETAILED DESCRIPTION

Figure 2:
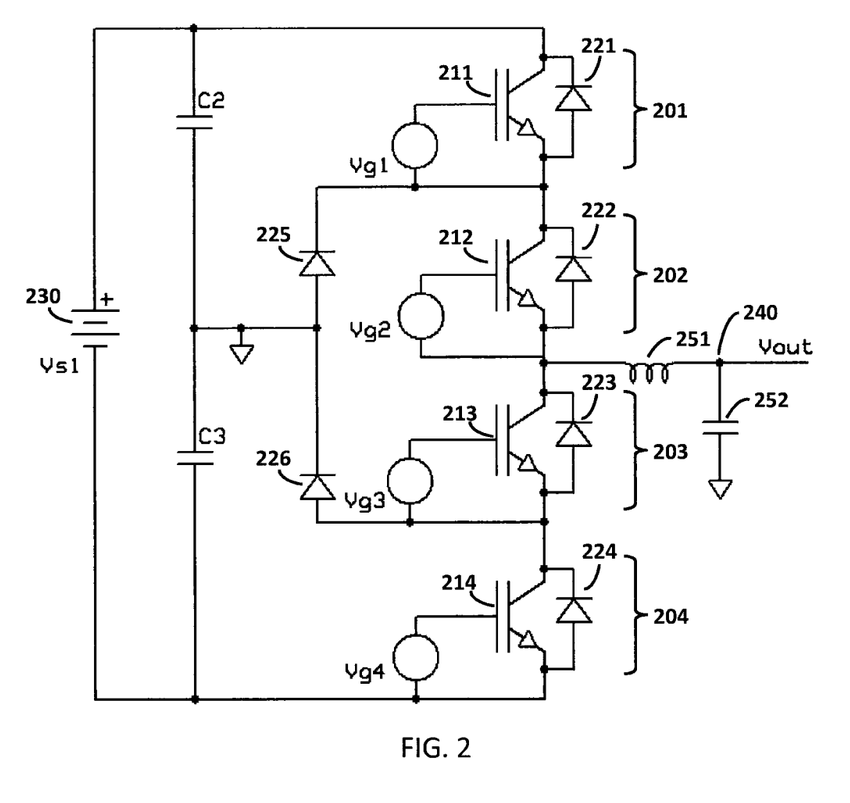
FIGS. 2, 3, and 6 are schematic diagrams of 3-level inverters described herein.

Described herein are multi-level inverter circuits which can be designed to have low loss and/or high efficiency. A first example is shown in FIG. 2. The inverter of FIG. 2 is similar to that of FIG. 1 but further includes an L-C output filter which includes inductor 251 and capacitor 252. The output filter substantially attenuates the switching frequency at the output node 240. The inductive load current continues in freewheeling fashion during the inactive portions of the switching cycle. During the positive half cycle, diode 225 provides the path for the freewheeling current when the gate of transistor 212 is biased OFF (i.e., when the gate electrode of transistor 212 is biased below the threshold voltage of transistor 212 relative to the source electrode of transistor 212). During the negative half cycle, diode 226 carries the current when the gate of transistor 214 is biased OFF.

For the circuit of FIG. 2, because IGBT transistors 211-214 have high switching losses, in particular when operated at high switching frequencies, energy loss during each switching cycle is high enough that the switching frequency must be limited in order to minimize power loss. With switching frequencies of about 15 kHz or less, which are typically the highest frequencies that can be employed with IGBT switches during operation without incurring substantially high power loss, passive components 251 and 252 required for filtering of inputs and outputs are large, heavy, and expensive. Much of the switching loss is associated with charge injected across a p-n or p-i-n junction (of one of the diodes 221-226 or within the IGBTs 211-214) during conduction. The forward voltage drop associated with a forward biased p-n or p-i-n junction also contributes to conduction loss. In a high voltage circuit, this contributes to the total power loss, generating heat which must be handled by the thermal management portion (e.g., heat sinks) of the system. These limitations can be addressed by utilizing high voltage transistors which lack intrinsic parasitic diodes anti-parallel to their channels and which can be switched at high frequencies (e.g., greater than 50 kHz or greater than 80 kHz) without incurring such high switching losses.

Figure 3:
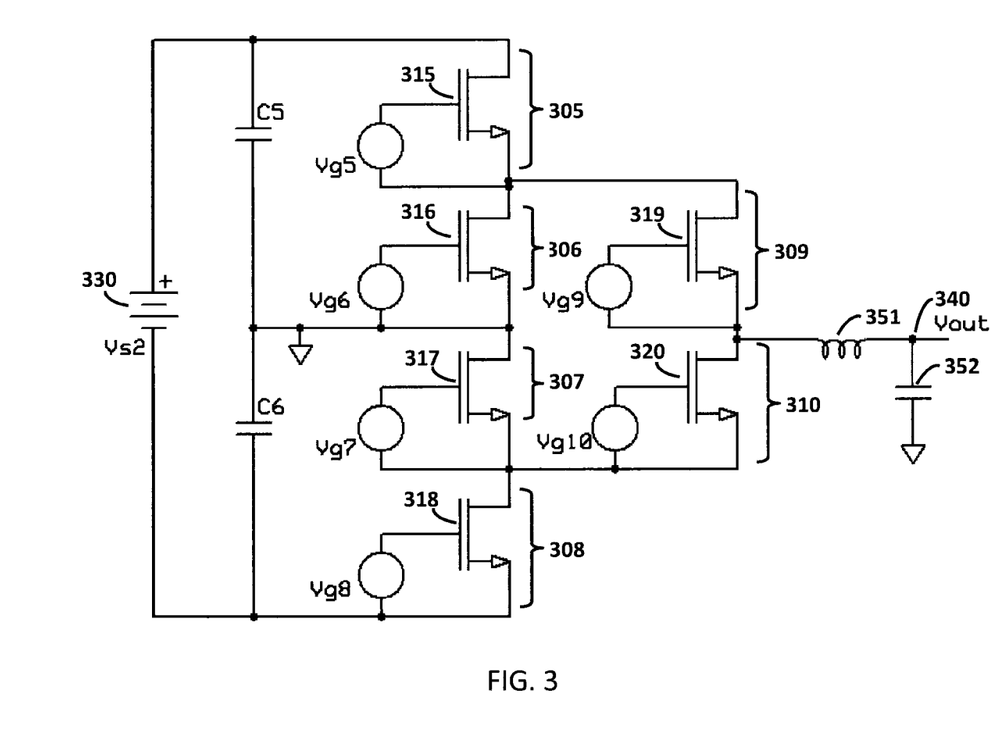

FIG. 3 illustrates a three-level inverter built with switches 305-310, where each switch is formed of a single transistor 315-320, respectively, without the need for any diodes. Switches 305-310 are each capable of blocking a voltage which is at least equal to 0.5 times the voltage Vs2 of the high-voltage supply 330. That is, for each switch 305-310, when the switch is biased OFF, it can block any voltage which is less than or equal to 0.5 times the voltage Vs2 of the high-voltage supply 330. In some implementations, the maximum voltage that the switches are each rated to block is between 0.5 times the voltage Vs2 of the high-voltage supply 330 and 1 times the voltage Vs2 of the high-voltage supply 330. As used herein, the term "blocking a voltage" refers to the ability of a switch, transistor, device, or component to prevent substantial current, such as current that is greater than 0.001 times the average on-state operating current during regular conduction, from flowing through the switch, transistor, device, or component when a voltage is applied across the switch, transistor, device, or component. In other words, while a switch, transistor, device, or component is blocking a voltage that is applied across it, the total current passing through the switch, transistor, device, or component will not be greater than 0.001 times the average on-state operating current during regular conduction.

Transistors 315-320 each include a conductive channel extending from the source to the drain, the conductivity of a portion of the channel being controlled by the gate. The transistors 315-320 also each lack an intrinsic parasitic diode anti-parallel to the channel, which allows switches 305-310 to be formed without anti-parallel diodes (such as diodes 221-224 of FIG. 2) while still allowing for low switching losses and low loss during reverse conduction mode.

During operation of the circuit of FIG. 3, each of transistors 315-320 operates as follows. In a first mode of operation, when voltage at the drain of the transistor is higher than voltage at the source of the transistor, and the gate of the transistor is biased relative to its source at a voltage below the transistor threshold voltage (i.e., the gate is biased OFF), the transistor blocks the drain-source voltage that is across the transistor. In this mode of operation, the drain source voltage may be as high as (Vs2)/2, and can be even higher immediately after switching due to ringing. In a second mode of operation, when voltage at the drain is higher than voltage at the source and the gate is biased relative to the source at a voltage above the transistor threshold voltage (i.e., the gate is biased ON), the transistor conducts substantial current from the drain to the source (i.e., in a first direction) through the channel of the transistor.

In a third mode of operation, when voltage at the drain is lower than voltage at the source and the gate is biased relative to the source at a voltage below the transistor threshold voltage (i.e., the gate is biased OFF), the transistor conducts substantial current from the source to the drain (i.e., in a second direction) through the channel of the transistor. Because this third mode of operation can result in conduction losses being too high, a fourth mode of operation can be achieved as follows. While the transistor is operated in the third mode of operation described above, the gate of the transistor is switched ON (i.e., to a voltage that is greater than the transistor threshold voltage relative to the voltage at the source). In this fourth mode of operation, current continues to flow through the channel of the transistor in the second direction, but conduction losses are reduced relative to the third mode of operation.

Figure 4:
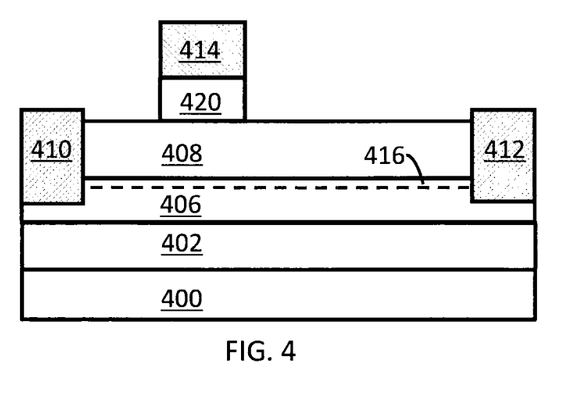
FIG. 4 is a cross-sectional view of a III-Nitride HEMT device.

Transistors that can be operated as described above include metal-semiconductor field-effect transistors (MES-FETs) which are configured such that they lack intrinsic anti-parallel diodes, and high electron mobility transistors (HEMTs) which are configured such that they lack intrinsic anti-parallel diodes. While MESFETs and HEMTs of any material system which include the above characteristics can be used, in high voltage switching applications, III-Nitride transistors such as III-Nitride HEMTs are capable of blocking the required high voltages while having low switching losses and low ON-state conduction losses. A typical III-Nitride HEMT, which is illustrated in FIG. 4, includes a substrate 400 (e.g., a silicon substrate), a III-N buffer layer 402 formed of a III-N semiconductor material such as AlN or AlGaN, a III-N channel layer 406 formed of a III-N semiconductor material such as GaN, a III-N barrier layer 408 formed of a III-N semiconductor material (e.g., AlGaN or AlN) having a larger bandgap than that of the III-N channel layer 406, and a two-dimensional electron gas (2DEG) channel 416 formed in the III-N channel layer 406 adjacent to the III-N barrier layer 408, the 2DEG channel 416 serving as the conductive channel of the transistor. The III-N HEMT further includes source and drain contacts 410 and 412, respectively, which contact the 2DEG channel 416. A gate electrode 414, which is deposited between the source and drain contacts 410 and 412, is used to modulate the conductivity of the channel in the region directly below the gate electrode 414. Optionally, a gate insulator 420 is included between the gate electrode 414 and the underlying III-N semiconductor materials.

As used herein, the terms III-Nitride or III-N materials, layers, devices, structures, etc., refer to a material, device, or structure comprised of a compound semiconductor material according to the stoichiometric formula $Al_xIn_yGa_zN$, where x+y+z is about 1. In a III-Nitride or III-N device, the conductive channel can be partially or entirely contained within a III-N material layer.

Referring again to FIG. 3, switches 305-310 (and transistors 315-320) can also be capable of being switched at frequencies of at least 50 kHz, at least 80 kHz, or at least 100 kHz without sustaining substantial switching losses. Traditional high power switching devices which are capable of blocking high voltages, such as IGBT's and power MOSFETs, which are typically silicon-based devices, experience switching losses at these frequencies that are greater than can be tolerated, and also inherently include parasitic diodes anti-parallel to their channels. On the other hand, III-Nitride or III-N field effect transistors, such as the III-N HEMT shown in FIG. 4, are capable of blocking the required high voltages while inherently being capable of higher switching speeds than a traditional IGBT or power MOS device. High voltage III-N devices, for example III-N HEMTs, have lower reverse recovery charge in their semiconductor portions, as well as lower junction capacitances as compared to traditional IGBTs or power MOSFETs. They have been demonstrated to be capable of switching at frequencies which are in some cases at least as high as 1 MHz (1000 kHz), but typically greater than 80 kHz, greater than 100 kHz, greater than 300 kHz, or greater than 500 kHz, depending on the specific design.

Still referring to FIG. 3, transistors 315 and 316 form a first diode-free bridge circuit capable of efficient high-frequency switching. Transistors 317 and 318 form a second bridge circuit of the same type, and transistors 319 and 320 form a third bridge circuit of the same type. The high-side switching function which was performed by transistor 211, diode 221, and diode 225 of the circuit of FIG. 2 is performed by transistors 315 and 316 in the circuit of FIG. 3, without the need for any diodes. Transistor 316 performs the neutral-point clamping function whether its gate is biased, relative to its source, at a voltage above or below the threshold voltage of the transistor. Likewise, transistors 317 and 318 perform the low-side switching function which was performed by transistor 214, diode 224, and diode 226 of the circuit of FIG. 2. These two pairs of transistors each function as two-level half-bridge circuits, operating from a voltage supply of magnitude (Vs2)/2.

Figure 5:
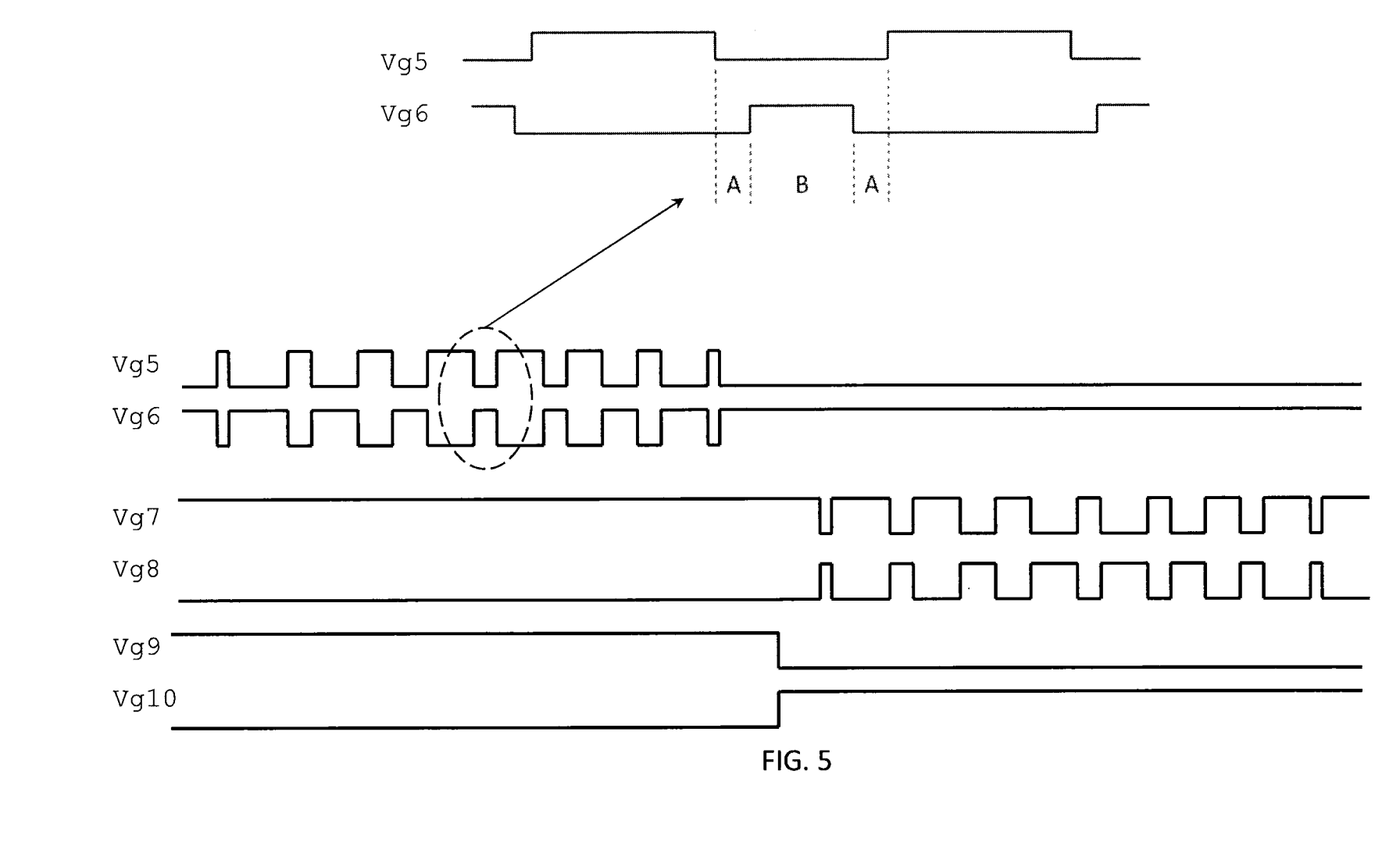
FIG. 5 illustrates voltage waveforms for the inverter circuit of FIG. 3.

The output transistors 319 and 320 act as a power multiplexer, selecting which half bridge drives the output and protecting the inactive half bridge from voltages in excess of (Vs2)/2. These transistors are not switched at the high PWM frequency used to switch transistors 315-318, but rather at the fundamental frequency of the output. Because the III-N transistors can conduct in both directions, the 0 state does not require both transistors 319 and 320 to be ON simultaneously. Rather, for the positive half cycle, the 0 state corresponds to transistors 316 and 319 being biased ON, with all other transistors biased OFF. For the negative half cycle, the 0 state corresponds to transistors 317 and 320 biased ON, with all other transistors biased OFF. FIG. 5 shows gate-drive waveforms provided by the various gate-drive circuits (Vg5, Vg6, etc.) of the circuit of FIG. 3 in producing one cycle of a sinusoidal output voltage with amplitude approaching (Vs2)/2.

The primary advantage of the circuit of FIG. 3 is that switching frequencies above 100 kHz may be used without excessive power loss, and with subsequent reduction in size of the passive components. For inverter circuits which must provide a smoothly varying, nearly sinusoidal output, a filter of the type shown in FIG. 3 may be required, and a reduction in the size, cost, and weight of this filter is a desirable. Switching of the transistors at these high frequencies allows for such a reduction in the size, cost, and weight of the filter. A second advantage is that the number of components required for the circuit is reduced, since no freewheeling diodes are required.

Although in the circuit of FIG. 3 the gates of transistors 319 and 320 are not switched at high frequencies (the frequencies at which the gates of switches 305-308 are switched are typically at least five times the frequencies at which the gates of switches 309-310 are switched, and can more commonly be at least 20 times the frequencies at which the gates of switches 309-310 are switched), they experience rapidly changing voltages at the switching frequency. In the positive half cycle, for example, when transistor 319 is ON and transistor 320 is OFF, all three terminals of transistor 319 slew between ground potential and +Vs/2 at the same slew rate and frequency as transistors 315 and 316. If transistor 319 is mounted to an insulated heat sink, then any capacitance between transistor 319 and the heat sink will be charged and discharged at this rate, with large instantaneous currents, potentially creating interference. At the same time the drain-to-source voltage of transistor 320 is charged to Vs/2 and discharged at the switching frequency and its output capacitance adds to the switching loss. For these reasons, it may be desirable to decouple transistors 319 and 320 from the switching nodes.

Figure 6:
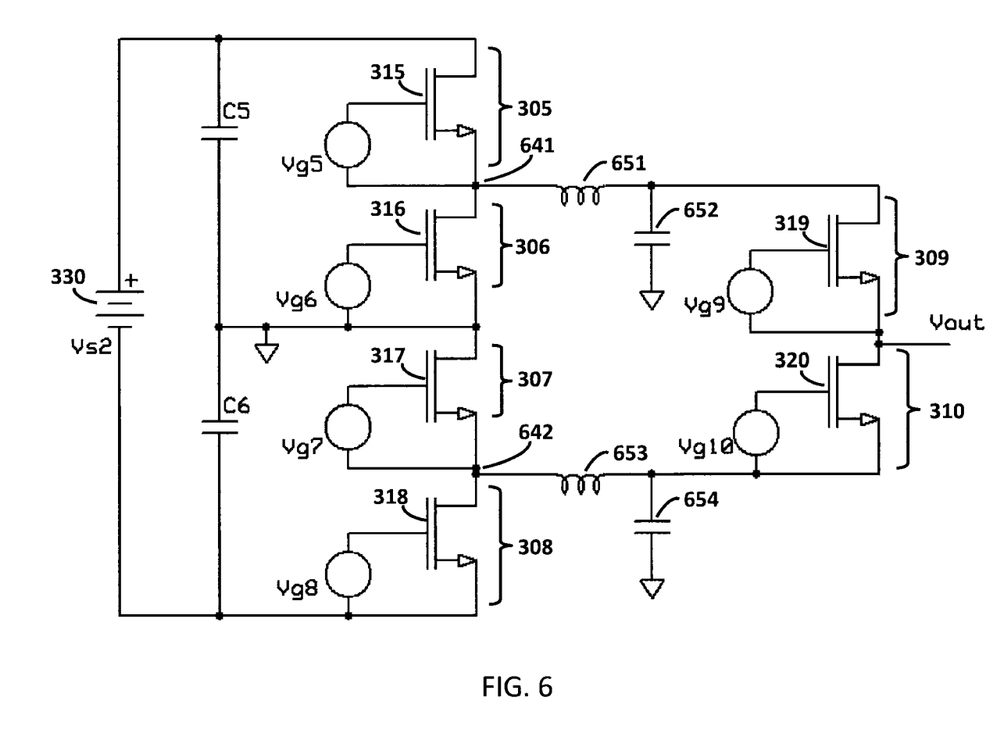

Because a very high switching frequency can be used for the switches 305-308 in the circuit of FIG. 3, it is a practical possibility to divide the output filter, formed by inductor 351 and capacitor 352, into two filters and move them to the intermediate nodes. FIG. 6 shows this topology. In the circuit of FIG. 6, an output filter is not included at the output node of the circuit (i.e., the filter formed by inductor 351 and capacitor 352 at the output node 340 of FIG. 3 is omitted from the circuit of FIG. 6). Instead, the circuit of FIG. 6 includes two separate L-C filters, the first filter constituting inductor 651 and capacitor 652, and the second constituting inductor 653 and capacitor 654. The first filter is at one end connected to the output node 641 of the half bridge formed by switches 305 and 306, and is at the opposite end connected to the high-side power terminal (e.g., the drain terminal) of switch 309. The second filter is at one end connected to the output node 642 of the half bridge formed by switches 307 and 308, and is at the opposite end connected to the low-side power terminal (e.g., the source terminal) of switch 310.

In this topology, the high-frequency components of the voltage and current signals that are output at nodes 641 and 642 (which result from the high-frequency PWM switching of switches 305-308) are filtered prior to the signals being received by output switches 309 and 310, which are switched at much lower frequencies. Consequently, output transistors 319 and 320 only experience voltage and current signals at the fundamental output frequency, which might be 60 Hz, for example. This can lead to lower losses and interference in the circuit. In some implementations, switches 305-308 are switched at frequencies of at least 20 kHz, at least 50 kHz, or at least 80 kHz, while switches 309-310 are switches at frequencies of 2 kHz or less, 1 kHz or less, 100 Hz or less, or 60 Hz or less.

Figure 7:
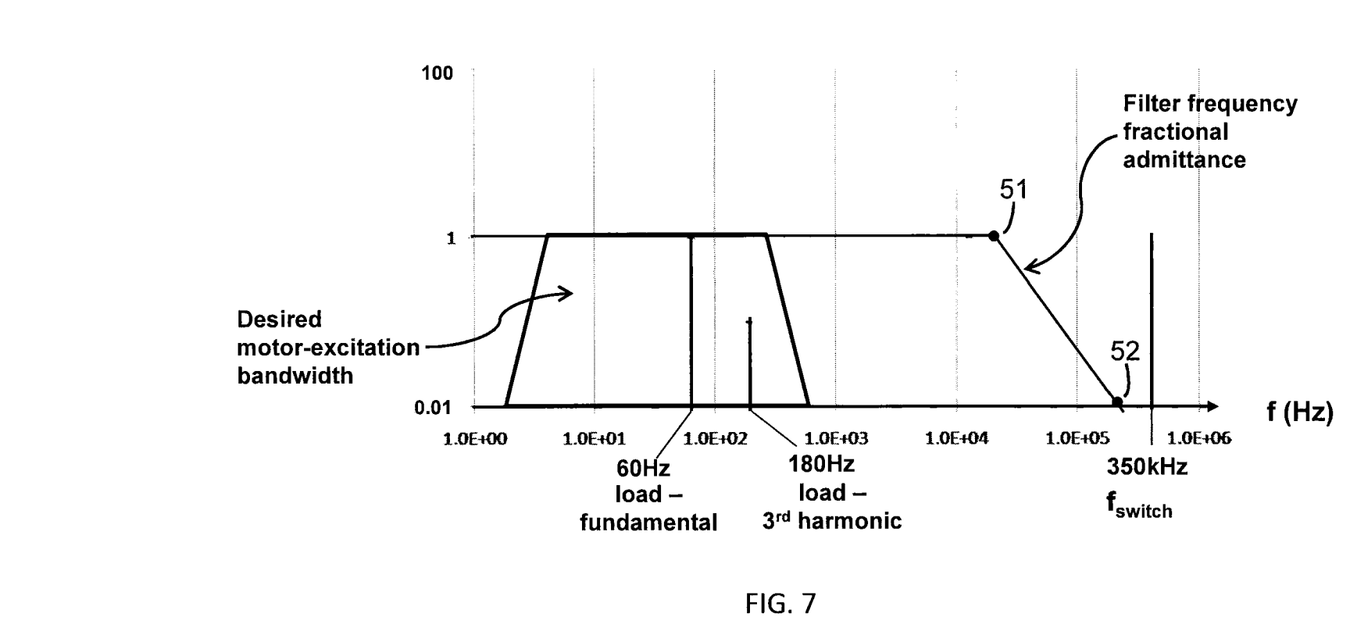
FIG. 7 is a representative plot of the frequency response of an L-C filter.

FIG. 7 shows a representative plot of the frequency response of each of the L-C filters used in the circuits of FIGS. 3 and 6. As shown, the filters can be low-pass filters, the 3 dB roll-off frequency (the frequency corresponding to point 51) is about 30 kHz, and the cut-off frequency (the frequency corresponding to point 52) is about 300 kHz. The 3 dB roll-off frequency is defined as the frequency at which the output voltage signal is attenuated by 3 dB relative to the input signal. Attenuation by the filter increases monotonically with frequency. As such, signals of higher frequency than the 3 dB roll-off frequency are attenuated by more than 3 dB, and signals of lower frequency than the 3 dB roll-off frequency are attenuated by less than 3 dB. For the L-C filters in FIGS. 2-3 and 6, the 3 dB roll-off frequency $f_{3\ dB}$ is given by the equation:

$$f_{3\ dB} = (4\pi^2 LC)^{-1/2}$$

The cut-off frequency of the filter is the frequency above which the fractional admittance (i.e., the ratio of a voltage signal applied at the input to that at the output) of the filter is low enough to prevent substantial output ripple at the switching frequency. The cut-off frequency is typically about 10 times the 3 dB roll-off frequency, but in applications where only very small output ripple can be tolerated, or for filters with a frequency roll-off that is smaller than 40 dB per decade, the cut-off frequency may be higher, for example about 20 times the 3 dB roll-off frequency.

For a filter with a higher 3 dB roll-off frequency, and therefore a higher cut-off frequency, the size of the inductor and/or capacitor can be reduced. When the switches 201-204 or 305-308 are switched at a frequency of about 80 kHz or greater, the cut-off frequency of the filter can be at least as high as 50 kHz, and the 3 dB roll-off frequency can be at least as high as 5 kHz or 10 kHz. When the switches 201-204 or 305-308 are switched at higher frequencies, for example at least 100 kHz, at least 200 kHz, at least 350 kHz, at least 500 kHz, or at least 1 MHz (1000 kHz), the cut-off frequency of the filter can be higher, for example at least 80 kHz, at least 150 kHz, at least 300 kHz, at least 450 kHz, or at least 900 kHz. The 3 dB roll-off frequency can be at least 12 kHz, at least 20 kHz, at least 30 kHz, at least 50 kHz, or at least 100 kHz.

Referring again to FIGS. 3, 6, and 7, because of the high 3 dB roll-off and cut-off frequencies that the L-C filter can be designed to have when combined with a switches that are switched at these higher frequencies, the frequency of the voltage and/or current signal applied to electrical load can be high. For example, a sinusoidal waveform of at least 1 kHz, at least 2 kHz, at least 5 kHz, at least 10 kHz, at least 50 kHz, or at least 100 kHz can be applied. An additional benefit of enabling a very high switching frequency, combined with a filter with high 3 dB and cut-off frequencies, is that the output waveform is not limited to a single-frequency sine wave. With adequate spacing between the fundamental excitation frequency and the switching frequency, multiple higher harmonics of the fundamental can also be faithfully included in the output waveform. Use of a $3^{rd}$ harmonic is sometimes employed with three phase motors as a way of utilizing the full available voltage. With the configurations of FIGS. 3 and 6, even higher harmonics could be introduced, such as a $5^{th}$ harmonic or a $7^{th}$ harmonic. For example, harmonic pre-distortion could be applied to the waveform to compensate for nonlinearity of the motor's magnetizing inductance. This could be particularly useful in designs where the magnetic circuit is operated at or near saturation of the magnetic material.

Another advantage to having a filter with such high 3 dB and cut-off frequencies, and correspondingly small inductive and capacitive elements, respectively, is that the filter and/or the entire circuit can be made extremely compact. For a conventional inverter circuit designed to deliver about 1 kW of power to an electrical load, the total volume of the filter alone can be around $10^4$ cm$^3$ or higher. Furthermore, the total volume of the filter scales approximately linearly with output power. Hence, higher output power requires even larger filter components, leading to excessively high costs for the filter, and preventing use of the inverter circuit in applications that require a more compact design.

Figure 8A:
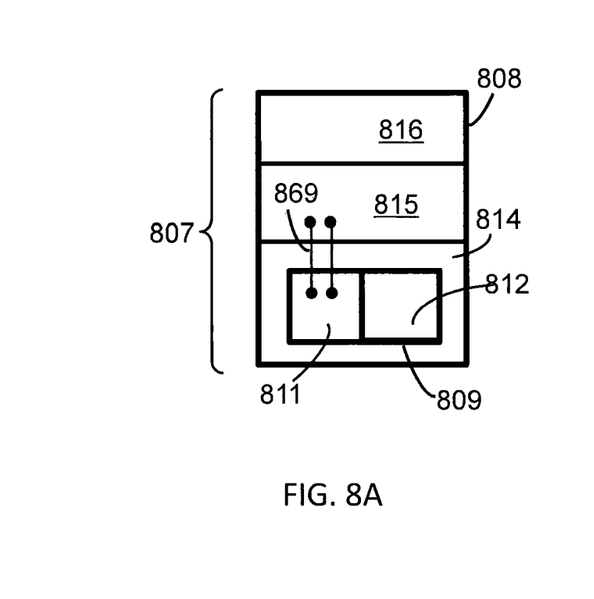
FIGS. 8A and 8B illustrate a plan view (top view) and circuit schematic, respectively, of a hybrid electronic device.
Figure 8B:
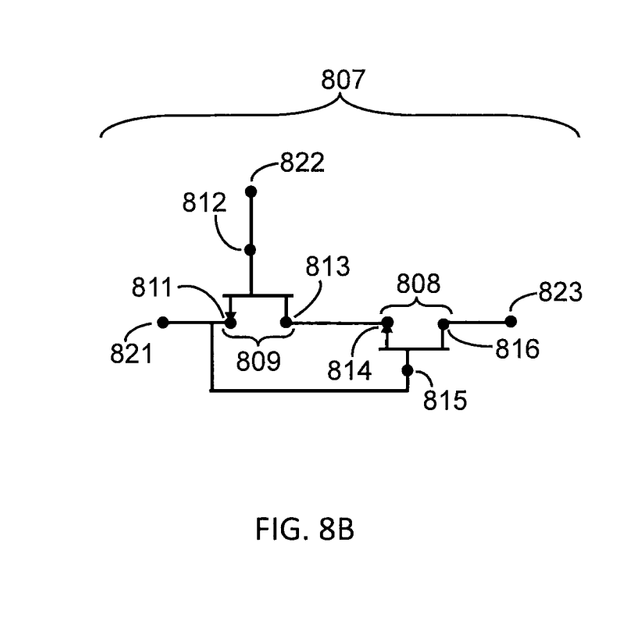

While the switches 305-310 in FIGS. 3 and 6 are each shown to be formed of single transistors, other devices which can inherently be switched at high frequencies could be used instead. For example, a hybrid device 807, shown in FIGS. 8A and 8B, could be used for any of switches 305-310. Although the switches 305-310 could be depletion-mode (D-mode) devices, it is often preferable that switches 305-310 be enhancement-mode or E-mode devices. That is, the switch is in the OFF state when the control terminal is held at the same voltage as the low-side terminal, and is turned ON by switching the voltage at the control terminal to a sufficiently high positive voltage relative to the low-side terminal. Since single high-voltage enhancement-mode transistors can be difficult to fabricate reliably, one alternative to a single high-voltage E-mode transistor is to combine a high-voltage depletion-mode transistor 808 with a low-voltage E-mode transistor 809 in the configuration of FIGS. 8A and 8B to form a hybrid device 807. Hybrid device 807 can be operated in the same way as a single high-voltage E-mode transistor, and in many cases achieves the same or similar output characteristics as a single high-voltage E-mode transistor. FIG. 8A shows a plan view schematic diagram of hybrid device 807, and FIG. 8B shows a circuit schematic of hybrid device 807. Hybrid device 807 includes a high-voltage D-mode transistor 808 and a low-voltage E-mode transistor 809. In the configuration illustrated in FIGS. 8A and 8B, E-mode transistor 809 is a vertical transistor, having its drain electrode 813 on the opposite side of the device from its source electrode 811 and gate electrode 812, and D-mode transistor 808 is a lateral transistor, having its source electrode 814, gate electrode 815, and drain electrode 816 all on the same side of the device. However, other configurations for each of transistors 808 and 809 are possible as well.

The source electrode 811 of the low-voltage E-mode transistor 809 and the gate electrode 815 of the high-voltage D-mode transistor 808 are both electrically connected together, for example with wire bonds 869, and together form the source 821 of the hybrid device 807. The gate electrode 812 of the low-voltage E-mode transistor 809 forms the gate 822 of the hybrid device 807. The drain electrode 816 of the high-voltage D-mode transistor 808 forms the drain 823 of the hybrid device 807. The source electrode 814 of the high-voltage D-mode transistor 808 is electrically connected to the drain electrode 813 of the low-voltage E-mode transistor 809. As seen in FIG. 8A, drain electrode 813, which is on the opposite side of the E-mode transistor 809 from the source and drain electrodes 811 and 812, respectively, can be electrically connected to source electrode 814 by mounting the low-voltage E-mode transistor 809 directly on top of the source electrode 814 with the drain electrode 813 directly contacting the source electrode 814, for example by using a conductive solder or resin. As such, the footprint (and therefore the cross-sectional area) of the low-voltage E-mode transistor 809 can be smaller than that of the high-voltage D-mode transistor 808, and in particular the footprint of the low-voltage E-mode transistor 809 can be smaller than that of the source electrode 814 of high-voltage D-mode transistor 808.

As used herein, a "hybrid enhancement-mode electronic device or component", or simply a "hybrid device or component", is an electronic device or component formed of a depletion-mode transistor and an enhancement-mode transistor, where the depletion-mode transistor is capable of a higher operating and/or breakdown voltage as compared to the enhancement-mode transistor, and the hybrid device or component is configured to operate similarly to a single enhancement-mode transistor with a breakdown and/or operating voltage about as high as that of the depletion-mode transistor. That is, a hybrid enhancement-mode device or component includes at least 3 nodes having the following properties. When the first node (source node) and second node (gate node) are held at the same voltage, the hybrid enhancement-mode device or component can block a positive high voltage (i.e., a voltage larger than the maximum voltage that the enhancement-mode transistor is capable of blocking) applied to the third node (drain node) relative to the source node. When the gate node is held at a sufficiently positive voltage (i.e., greater than the threshold voltage of the enhancement-mode transistor) relative to the source node, current passes from the source node to the drain node or from the drain node to the source node when a sufficiently positive voltage is applied to the drain node relative to the source node. When the enhancement-mode transistor is a low-voltage device and the depletion-mode transistor is a high-voltage device, the hybrid component can operate similarly to a single high-voltage enhancement-mode transistor. The depletion-mode transistor can have a breakdown and/or maximum operating voltage that is at least two times, at least three times, at least five times, at least ten times, or at least twenty times that of the enhancement-mode transistor.

As used herein, a "high-voltage device", such as a high-voltage transistor, is an electronic device which is optimized for high-voltage switching applications. That is, when the transistor is off, it is capable of blocking high voltages, such as about 300V or higher, about 600V or higher, about 1200V or higher, or about 1700V or higher, and when the transistor is on, it has a sufficiently low on-resistance ($R_{ON}$) for the application in which it is used, i.e., it experiences sufficiently low conduction loss when a substantial current passes through the device. A high-voltage device can at least be capable of blocking a voltage equal to the high-voltage supply or the maximum voltage in the circuit for which it is used. A high-voltage device may be capable of blocking 300V, 600V, 1200V, 1700V, or other suitable blocking voltage required by the application. In other words, a high-voltage device can block any voltage between 0V and at least $V_{max}$, where $V_{max}$ is the maximum voltage that could be supplied by the circuit or power supply. In some implementations, a high-voltage device can block any voltage between 0V and at least $2*V_{max}$. As used herein, a "low-voltage device", such as a low-voltage transistor, is an electronic device which is capable of blocking low voltages, such as between 0V and $V_{low}$ (where $V_{low}$ is less than $V_{max}$), but is not capable of blocking voltages higher than $V_{low}$. In some implementations, $V_{low}$ is equal to about $|V_{th}|$, greater than $|V_{th}|$, about $2*|V_{th}|$, about $3*|V_{th}|$, or between about $|V_{th}|$ and $3*|V_{th}|$, where $|V_{th}|$ is the absolute value of the threshold voltage of a high-voltage transistor, such as a high-voltage-depletion mode transistor, contained within the hybrid component in which a low-voltage transistor is used. In other implementations, $V_{low}$ is about 10V, about 20V, about 30V, about 40V, or between about 5V and 50V, such as between about 10V and 40V. In yet other implementations, $V_{low}$ is less than about $0.5*V_{max}$, less than about $0.3*V_{max}$, less than about $0.1*V_{max}$, less than about $0.05*V_{max}$, or less than about $0.02*V_{max}$.

In the hybrid device of FIGS. 8A and 8B, while the high-voltage D-mode transistor 808 typically lacks a parasitic diode anti-parallel to the channel, the low-voltage E-mode transistor 809 may include an intrinsic parasitic anti-parallel diode. Or, an external diode can be connected anti-parallel to the channel. In the case where transistor 809 includes an intrinsic parasitic anti-parallel diode but without an external diode connected in parallel to the parasitic diode, hybrid device 807 operates as follows. In a first mode of operation, when voltage at the drain of the hybrid device (i.e., the drain of D-mode transistor 808) is higher than voltage at the source of the hybrid device (i.e., the source of E-mode transistor 809) and the gate of the hybrid device (i.e., the gate of E-mode transistor 809) is biased relative to the source at a voltage below the threshold voltage of E-mode transistor 809 (i.e., the gate is biased OFF), the hybrid device 807 blocks the drain-source voltage that is across the device. In this mode of operation, the drain source voltage may be as high as (Vs2)/2, and can be even higher immediately after switching due to ringing. In a second mode of operation, when voltage at the drain of the hybrid device is higher than voltage at the source of the hybrid device, and the gate of the hybrid device is biased relative to the source at a voltage above the threshold voltage of E-mode transistor 809 (i.e., the gate is biased ON), the hybrid device conducts substantial current from the drain of the hybrid device to the source of the hybrid device (i.e., in a first direction) through the channels of both transistors 808 and 809. In a third mode of operation, when voltage at the drain of the hybrid device is lower than voltage at the source of the hybrid device, and the gate is biased relative to the source at a voltage below the transistor threshold voltage (i.e., the gate is biased OFF), the hybrid device conducts substantial current from the source of the hybrid device to the drain of the hybrid device (i.e., in a second direction). In this mode of operation, the current conducts through the channel of D-mode transistor 808 and through the parasitic diode of E-mode transistor 809. Since E-mode transistor 809 is a low voltage device, conduction and switching losses incurred due to switching on of the parasitic diode are not as high as those incurred for conduction through a parasitic diode of a high voltage transistor. However, this third mode of operation can still result in conduction losses being too high, and so a fourth mode of operation can be achieved as follows. While the hybrid device is operated in the third mode of operation described above, the gate of the hybrid device is switched ON (i.e., to a voltage that is greater than the hybrid device threshold voltage relative to the voltage at its source). In this fourth mode of operation, current continues to flow through the channel of the D-mode transistor 808 in the second direction, but current in the E-mode transistor 809 flows through the transistor channel rather than through the parasitic diode. Hence, conduction losses are reduced relative to the third mode of operation.

In a hybrid device in which an external diode is connected anti-parallel to the channel, the external diode performs the same function as the parasitic diode in the four modes of operation described above.

In FIGS. 8A and 8B, D-mode transistor 808 can be a III-Nitride transistor, such as a III-N HEMT, and E-mode transistor 809 can be a Silicon-based device, such as a Si MOSFET. Alternatively, E-mode transistor 809 can be a III-N transistor as well. Because E-mode transistor 809 is a low-voltage device, and therefore does not need to be capable of blocking the entire circuit high voltage, it can be made to switch much faster than a high-voltage device formed of the same material. Hybrid device 807 can therefore be capable of operating at the higher switching frequencies for which the filter is designed.

A number of implementations have been described. Nevertheless, it will be understood that various modifications may be made without departing from the spirit and scope of the invention. For example, additional half-bridge circuits may be included to create any number of output voltage levels. It is also understood that the topology is not limited to production of pure sinusoidal waveforms. Although the circuit is referred to as an inverter, consistent with a common application, it could be applied to any switch-mode amplifier function. Accordingly, other embodiments are within the scope of the following claims.

What is claimed is:

1. A multilevel inverter comprising:
    a first half bridge connected in series with a second half bridge, the first and second half bridges each comprising a semiconductor-based switch having a channel, the semiconductor-based switch being configured to block a substantial voltage in a first direction during a first mode of operation, to conduct substantial current through the channel in the first direction during a second mode of operation, and to conduct substantial current through the channel in a second direction during a third mode of operation, wherein during the third mode of operation a gate of the semiconductor-based switch is biased relative to a source of the semiconductor-based switch at a voltage that is less than a threshold voltage of the semiconductor-based switch;
    a third half bridge having a low-side switch coupled to a high-side switch; and
    a first filter and a second filter,
    wherein the first filter is coupled between an output node of the first half bridge and a power terminal of the high-side switch, the first filter being directly connected to ground, and
    wherein the second filter is coupled between an output node of the second half bridge and a power terminal of the low-side switch, the second filter being directly connected to ground,
    such that the low-side switch and the high-side switch of the third half bridge are to be switched at a substantially lower frequency than a switching frequency of the semiconductor-based switch.

2. The multilevel inverter of claim 1, wherein the semiconductor-based switch comprises a III-Nitride transistor.

3. The multilevel inverter of claim 1, wherein the semiconductor-based switch comprises an enhancement-mode transistor coupled to a III-Nitride depletion-mode transistor.

4. A multilevel inverter, comprising:
    a first half bridge connected in series with a second half bridge, the first and second half bridges each comprising a plurality of switches;
    a third half bridge comprising a high-side switch coupled to a low-side switch at an output node of the third half bridge, the high-side switch including a first gate, a first power terminal and a second power terminal, the low-side switch including a second gate, a third power terminal and a fourth power terminal, wherein the second power terminal of the high-side switch and the third power terminal of the low-side switch are coupled to the output node of the third half bridge; and
    a first low-pass filter and a second low-pass filter;
    wherein the first low-pass filter is coupled between an output node of the first half bridge and the first power terminal of the high-side switch, the first low-pass filter being directly connected to ground, and
    wherein the second low-pass filter is coupled between an output node of the second half bridge and the fourth power terminal of the low-side switch, the second low-pass filter being directly connected to the ground.

5. The multilevel inverter of claim 4, wherein the plurality of switches of the first and second half bridges are configured to be switched at a frequency of at least 50 kHz, and the high-side switch and the low-side switch are configured to be switched at a frequency of 1 kHz or less.

6. The multilevel inverter of claim 4, wherein the first low-pass filter and the second low-pass filter each include an inductor and a capacitor.

7. The multilevel inverter of claim 4, wherein the plurality of switches of the first and second half bridges are configured to be switched at a frequency that is at least five times greater than a switching frequency of the high-side switch and the low-side switch.

8. The multilevel inverter of claim 4, wherein at least one of the plurality of switches comprises a III-Nitride transistor.

9. The multilevel inverter of claim 4, wherein at least one of the plurality of switches comprises an enhancement-mode transistor coupled to a III-Nitride depletion-mode transistor.

* * * * *